J. L. GETTINGER.
BURGLAR ALARM FOR AUTOMOBILES.
APPLICATION FILED NOV. 12, 1919.
1,411,246.
Patented Mar. 28, 1922.
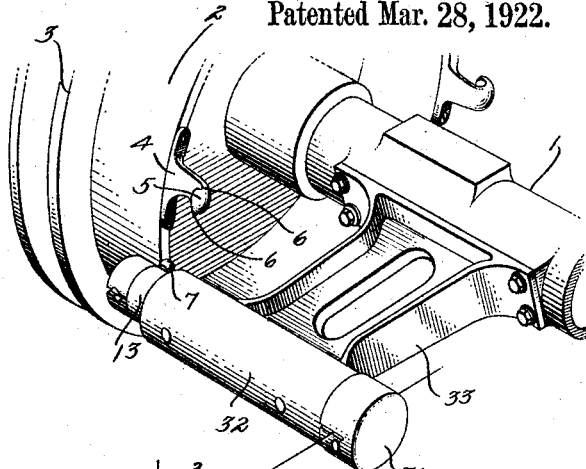
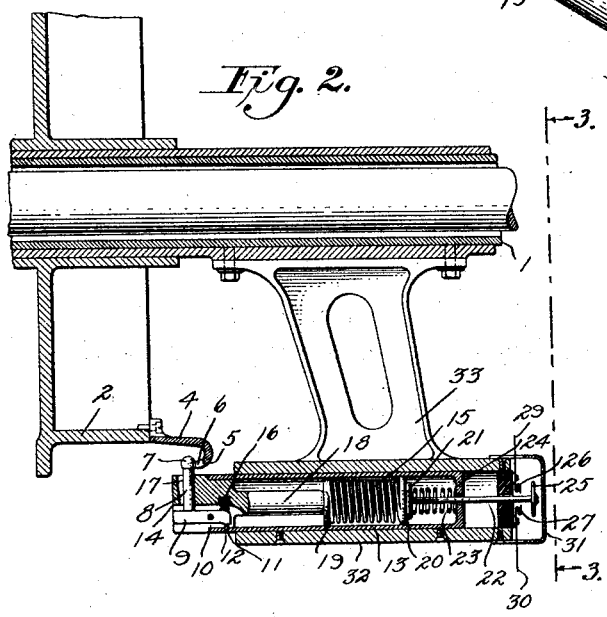
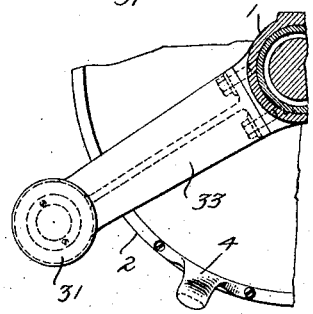
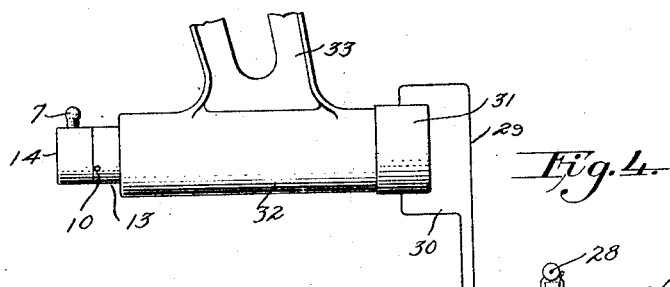
WITNESSES:
INVENTOR
John L. Gettinger
BY
ATTORNEYS

UNITED STATES PATENT OFFICE.

JOHN LAWRENCE GETTINGER, OF NEW YORK, N. Y.

BURGLAR ALARM FOR AUTOMOBILES.

1,411,246.     Specification of Letters Patent.     Patented Mar. 28, 1922.

Application filed November 12, 1919. Serial No. 337,388.

*To all whom it may concern:*

Be it known that I, JOHN L. GETTINGER, a citizen of the United States, and a resident of the city of New York, borough of Manhattan, in the county and State of New York, have invented a new and useful Burglar Alarm for Automobiles, of which the following is a full, clear, and exact description.

This invention relates to burglar alarms for automobiles and has for an object to provide an improved construction wherein a movement of the automobile will produce a continuous ringing of an alarm.

Another object of the invention is to provide a sounding device and means associated therewith actuated by any wheel of the automobile when the wheel is turned over so as to give an audible signal in case the automobile is moved by an unauthorized person.

A still further object of the invention is to provide a thief or burglar alarm for automobiles where a removable connecting head is used and placed in position by the owner when leaving the automobile, the same coacting with an electrical switch for causing a completion of a circuit to a sounding device when the head is removed in an improper manner.

In the accompanying drawing:

Figure 1 is a fragmentary perspective view showing part of the hub of an automobile and part of the axle with an embodiment of the invention applied thereto.

Figure 2 is a sectional view through the structure shown in Figure 1, illustrating the detail construction of the removable head and contact mechanism embodying certain features of the invention.

Figure 3 is a sectional view through Figure 2, approximately on line 3—3.

Figure 4 is a diagram showing the electrical circuit and the sounding member.

In forming the device embodying the invention it is aimed to provide an electrically operated bell, or other sounding device when the wheels of the automobile are turned over. The arrangement is such that under ordinary circumstances during the use of the automobile by the owner the bell will not be sounded, but when the proper or authorized driver leaves the machine he closes the circuit of the bell and places a removable connecting member or head in line with a projection from one of the wheels of the automobile. This removable member acts to normally keep the circuit of the bell open so that as long as the automobile is standing still the bell will not sound. However, in case a thief, or in fact in case any one starts the automobile going without removing the connecting member or head the projection on one of the wheels will strike the head and release the same whereupon the circuit of the bell is closed and said bell will begin to ring. This, of course, will not stop the thief, nor stop the automobile, but will be notice to everyone that the automobile is being stolen.

Referring to the accompanying drawing by numerals, 1 indicates a hollow rear axle provided in ordinary automobiles now in common use, and 2 a brake ring connected to one of the rear wheels 3. The device has been shown in connection with the rear axle and the rear wheel, but it is evident that it could be connected to the front wheels if desired, or to all the wheels of the automobile. A stop or projection 4 is secured in any desired manner to the brake ring 2 as for instance by screws. If screws are used preferably the heads are filed off so that the stop cannot be removed. The various stops 4 are provided with overhanging extensions 5 formed with slanting cam edges 6, whereby as they rotate they will come in contact with the inner part of the knob 7 of the pin 8 and force the knob outwardly, the same swinging with pin 8 and lever 9 on the pin 10 as shown in Figure 2. This swinging outward movement will cause the locking projection 11 mounted on lever 9 to be pulled out of the aperture 12 in the inner sleeve 13. When this occurs the connecting member or head 14 is released and is projected quickly out of the inner sleeve 13 by spring 15. The head 14 not only carries lever 9 and associate parts, but carries a spring 16 for normally holding the lever in a locked position as shown in Figure 2. The head is formed with a suitable opening 17 for permitting the proper movement of the pin 8 and with an extension 18 pressing against a follower or washer 19, preferably soldered or otherwise secured to one end of spring 15. The other end of spring 15 is soldered or otherwise rigidly secured to a washer 20, connected if desired with the rounded end 21 of pin 22. A spring 23 surrounds part of pin 22 and presses one end against the enlargement 21 and the other against the end 24 of sleeve 13 so that when spring 15 is released spring 23 may move the rod 22 longitudinally and cause the contact washer 25 to move downwardly into engagement with the contact terminals 26 and 27, whereupon the circuit of bell 28 is closed as the wires 29 and 30 are connected to these terminals. Preferably a protecting cap 31 is fitted over the end of the outer sleeve 32 for protecting the terminals 26 and 27 and associate parts. It will be noted that sleeve 32 is preferably made integral with a suitable bracket 33 which is bolted or otherwise rigidly secured to the axle 1. The wires 29 and 30 are connected with bell 28, a manually actuated switch 34, and a source of current 35, whereby when the contact washer 25 is in engagement with the terminals 26 and 27 bell 28 will be operated continuously provided switch 34 is closed. These wires aand switches are preferably enclosed in a metal sheathing, or otherwise protected in some manner so as to make it impossible, or difficult, for a burglar to cut the wires. If desired the cap 31 is held on by screws which have their heads filed off or held in some other desired way which will prevent ready tampering.

In operation, during the ordinary use of the car by an authorized person switch 34 is open and the head 14 is removed. When the authorized driver desires to leave the car he places the head 14 in position as shown in Figure 2 and then closes switch 34. This sets the alarm so that in case the automobile is moved either by an authorized or unauthorized person the projection 4 will strike against knob 7 and cause the disengagement of the head 14 whereupon spring 15 will force the head out of the sleeve 13 and allow spring 23 to move the contact portion 25 into contact with the terminals 26 and 27 so that the circuit of bell 28 is closed. The bell will then ring until either the head 14 is again placed in position or switch 34 is opened. In case the automobile is not moved the parts will, of course, remain as originally placed. In a case of this kind the authorized driver on re-entering the automobile will open switch 34 and then remove head 14 manually. This will disconnect the current from the bell so that the device is in-operative. When the driver leaves the car again the same thing is done and so on as often as desired.

What I claim is:

1. A circuit maker and breaker for burglar alarm for automobiles comprising a stop adapted to be connected with one of the wheels of an automobile, a pair of spaced terminals, a connecting contact washer, a spring acting to normally hold said contact washer in contact with said terminals so as to maintain the circuit closed at that point, a second spring adapted to overcome the first mentioned spring when in use, and a removable head acting to compress said second mentioned spring, said head being formed with a catch for holding same normally in a stationary position, said catch being provided with a pin projecting into the path of movement of the stop on said wheel whereby when the wheel is turned over said catch will be operated and said catch released whereby the second mentioned spring will operate and release the first mentioned spring for permitting the closing of the circuit at said terminals.

2. A circuit maker and breaker comprising a pair of terminals, a spring pressed member for connecting said terminals, a master spring for overcoming said spring pressed member, a housing for supporting said spring pressed member and said master spring, a head removably positioned in said housing and acting on said spring for placing same under tension, a catch carried by said head formed with a pin interlocking with said housing, and a lever connected with said pin, and an operating pin extending from the lever, and a stop adapted to strike said pin and move the same to one side for disengaging the catch whereby said head will be forced out of said casing by said master spring and the spring pressed member released so as to connect said terminals.

3. A circuit maker and breaker for burglar alarm for automobiles comprising a stop connected to one of the wheels of the automobile, a casing to connect to a stationary part of the automobile, a head removably positioned in said casing, a catch for normally holding said head in the casing, said catch being provided with an extending member adapted to be engaged by said stop for releasing the catch, a master spring compressed by said head, a pair of terminals, a contact for connecting said terminals, and a comparatively weak spring acting on said contact for causing the same to move in engagement with said terminals, said comparatively weak spring being overcome by said master spring when said head is in position whereby said contact is out of engagement with said terminals.

4. In a circuit maker and breaker for burglar alarms for automobiles a stop, a casing open at both ends, a sleeve arranged in said casing provided with an open end and a closed end, said closed end having an aperture therein, a head fitting into said sleeve and provided with a projection, a catch mounted in said head adapted to interlock with said sleeve, a pin adapted to be operated by said stop, said pin being rigidly secured to said catch so that when the pin is moved by the stop the catch will be disengaged so as to release said head, a master spring adapted to be compressed by the projection from said head, said master spring being arranged in said sleeve, a pin extending through the aperture in said sleeve, said pin having an enlargement at each end, one of said enlargements being acted upon by said master spring for holding the pin in a given position, a second spring acting on the closed end of said sleeve and on one of the enlargements of the pin for moving the same in a direction against the action of said master spring, and a pair of terminals arranged in the path of movement of one of said enlargements whereby when said head has been disengaged said master spring will force said head from the sleeve and will become released so as to permit the second mentioned spring to move the pin and thereby close the circuit of said terminals.

JOHN LAWRENCE GETTINGER.